United States Patent
Walker

(10) Patent No.: US 7,112,635 B2
(45) Date of Patent: Sep. 26, 2006

(54) ACID CATALYZED COPOLYMERIZATION OF WATER, TETRAHYDROFURAN AND MULTIFUNCTIONAL EPOXIDES AND USES THEREOF

(75) Inventor: Frederick Herbert Walker, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 431 days.

(21) Appl. No.: 10/799,027

(22) Filed: Mar. 12, 2004

(65) Prior Publication Data

US 2005/0203266 A1    Sep. 15, 2005

(51) Int. Cl.
*C08L 63/00* (2006.01)
*C08L 75/00* (2006.01)
*C08G 65/02* (2006.01)
*B32B 27/38* (2006.01)
*B32B 27/40* (2006.01)

(52) U.S. Cl. .......... 525/528; 428/413; 428/423.1; 528/88; 528/91; 528/106; 528/110; 528/116; 528/408; 528/418; 528/419; 528/421; 525/523

(58) Field of Classification Search ............ None
See application file for complete search history.

(56) References Cited

U.S. PATENT DOCUMENTS

| | | | |
|---|---|---|---|
| 2,872,427 A | 2/1959 | Schroeder | |
| 3,004,931 A * | 10/1961 | Brueschweiler et al. | 528/91 |
| 3,816,279 A | 6/1974 | S. I. Schlesinger | |
| 4,183,821 A | 1/1980 | Langdon et al. | |
| 4,687,830 A * | 8/1987 | Weber et al. | 528/54 |
| 4,728,542 A * | 3/1988 | Nachtkamp et al. | 427/389 |
| 6,331,583 B1 | 12/2001 | Walker | |
| 6,365,644 B1 | 4/2002 | Yamamura et al. | |
| 6,800,717 B1 * | 10/2004 | Walker et al. | 528/88 |

FOREIGN PATENT DOCUMENTS

EP    1 262 505 A1    12/2002

OTHER PUBLICATIONS

European Search Report No. 04005589.9-2102 dated Jun. 7, 2004.
C. A. May, "Epoxy Resins Chemistry and Technology," Marcel Dekker, Inc.: New York (1988), p. 495.
M. Lidarik, et al., "Cationic Polymerization of Glycidyl Ethers," Polymer Sci. USSR (1984), vol. 5, pp. 859-869.
R. W. Lenz, "Organic Chemistry of Synthetic High Polymers," Interscience Publishers: New York (1967), pp. 531-546.
U.S. Appl. No. 10/062,924, filed Jan. 31, 2002.

* cited by examiner

*Primary Examiner*—Michael J. Feely
(74) *Attorney, Agent, or Firm*—Michael Leach

(57) ABSTRACT

Non-gelled polymeric polyols are prepared by the acid catalyzed copolymerization of water, tetrahydrofuran and multifunctional epoxy resins. The polyols can be cured with OH reactive crosslinkers such as amino resins and polyisocyanates to yield thermosetting coatings with useful properties.

24 Claims, No Drawings

ACID CATALYZED COPOLYMERIZATION OF WATER, TETRAHYDROFURAN AND MULTIFUNCTIONAL EPOXIDES AND USES THEREOF

FIELD OF THE INVENTION

The present invention relates to polymeric polyols prepared by the polymerization of epoxy resins.

BACKGROUND OF THE INVENTION

Epoxy resins are commercially important materials that are used extensively to make thermosetting products for use in coatings, adhesives, composites, and many other applications. The largest volume of epoxy resins utilized in commerce are those based upon the diglycidyl ether of bisphenol-F (DGEBF), epoxy novolac resins, and those based upon the diglycidyl ether of bisphenol-A (DGEBA). Of these, the bisphenol-A based products are utilized in much larger volumes than the other products.

Bisphenol-A derived epoxy resins are essentially linear polymers available in a wide range of molecular weights, represented generically by the following chemical structure:

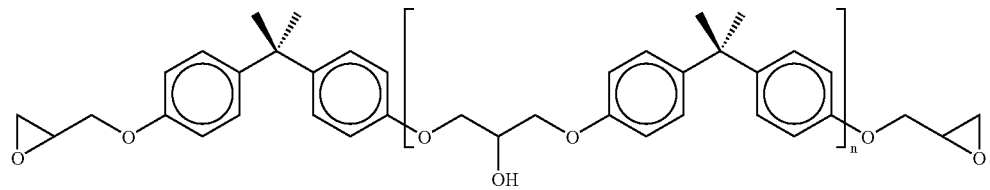

where n represents the average number of repeat units in the polymer. The low end of the range of available molecular weight products are made by reaction of bisphenol-A with excess epichlorohydrin, followed by treatment with base. They are referred to by those who work in the industry as liquid epoxy resin, DGEBA, or BADGE, even though most of the commercial products are not pure DGEBA but often have a value of n of about 0.15 or slightly higher. Higher molecular weight epoxy resins (greater than about 400 Daltons) are commercially prepared by the so-called "advancement process" which is the, reaction of excess DGEBA with bisphenol-A, where the ratio of DGEBA to bisphenol-A is used to control the final average molecular weight.

Because high molecular weight epoxy resins are prepared by the reaction of DGEBA and bisphenol-A, such resins prepared using current commercial processes have relatively high levels of residual bisphenol-A and DGEBA in the final products. Unfortunately, these compounds are of concern with regard to their human health effects and pseudo-estrogenic activity. This is particularly true in the industry for coatings for food and beverage can interiors, where epoxy resins are currently utilized in large volumes for coatings that are crosslinked with amino resins and other OH-reactive crosslinking agents. Thus, there is a strong need to develop coatings with properties similar to those obtained from crosslinked epoxy resins, but without such high levels of residual DGEBA and bisphenol-A, which can be extracted into the contents of the can and thus become a component of the human diet.

Epoxy resins contain epoxide rings at the chain ends, and (with the exception of pure DGEBA) secondary hydroxyl groups spaced along the polymer backbone. Both of these functional groups can be utilized to cure the epoxy resin. For example, multifunctional amines, mercaptans, and carboxylic acids are utilized to crosslink through the epoxide ring. Amino resins such as melamine-formaldehyde and urea-formaldehyde resins, and polyisocyanates are utilized to crosslink through the hydroxyl groups. Finally, resins such as resoles crosslink through both the hydroxyl and epoxide functional groups. For most purposes, epoxy resins that are crosslinked via the epoxide end groups have epoxy equivalent weights (EEW) of at most about 800, and frequently far less than this. On the other hand, when crosslinked through hydroxyl groups, higher molecular weight epoxy resins are generally preferred, and very low molecular weight epoxy resins such as pure DGEBA which lack OH groups cannot be utilized at all in such a thermosetting system.

Despite the fact that epoxy resins can be crosslinked with amino resins and the like through the secondary hydroxyl groups on the resin backbone, it is generally found that significantly higher temperatures and/or bake times are required than are necessary with other polyols utilized in coatings, such as acrylic polyols and polyester polyols. It is thought that the relatively hindered environment of the OH groups on the epoxy resin is responsible for this effect. Obviously, this is usually a significant drawback to the utilization of epoxy resins in such coatings, since higher oven temperatures and/or bake times lead to higher production costs.

The cationic or acid-catalyzed polymerization (or homopolymerization) of multifunctional epoxy resins to yield gelled or crosslinked final products is a well-known process of significant commercial importance. Lewis acids are most commonly employed, but appropriate Brønsted acids can also be utilized. For example, C. A. May (Ed.), *Epoxy Resins Chemistry and Technology*, Marcel Dekker, Inc.: New York, 1988, reports (p. 495) that Lidarik et. al. (Polymer Sci. USSR, 1984, 5, 859) polymerized glycidyl ethers with complexes of antimony pentachloride, boron trifluoride, and perchloric acid. Additional examples are reported in May. In addition, the photoinitiated cationic polymerization of epoxy resins is well-known, and also of commercial importance. As reviewed in May (pp. 496–498), cationic photoinitiators are materials that upon photolysis generate strong Brønsted acids, which serve as the true catalyst for the epoxide polymerization.

Lidarik et. al. (ibid.) prepared gelled products by the acid catalyzed polymerization of epoxy resins in tetrahydrofuran (THF) solutions, and obtained evidence that THF-derived products were incorporated into the network.

The copolymerization of water with monofunctional epoxide compounds has been known for some time. For example, R. W. Lenz, *Organic Chemistry of Synthetic High*

*Polymers*, Interscience Publishers: New York, 1967, pp. 531–546, reviews the ring-opening polymerization of cyclic ethers including epoxides, and notes that C. Matignon, et.al. (*Bull. Soc. Chim.*, 1, 1308 (1934)) studied the effect of water content on the oligomer distributions obtained from the acid-catalyzed hydration of ethylene oxide.

U.S. Pat. No. 6,331,583 B1 discloses compositions of emulsified polymeric polyols prepared by a method comprising the acid catalyzed, non-reversible polymerization of lower molecular weight epoxy resins in an aqueous emulsified state. Coating compositions are prepared from the emulsified polymeric polyols crosslinked with various crosslinking agents.

U.S. application Ser. No. 10/062,924, filed 31 Jan. 2002 discloses the preparation of polymeric polyols by the acid-catalyzed solution copolymerization of epoxy resins and water.

U.S. Pat. No. 2,872,427 discloses oil-in-water emulsions of polyepoxide resins and their heat cure with various curing agents, including acid acting curing agents.

SUMMARY OF THE INVENTION

Multifunctional epoxide compounds, tetrahydrofuran (THF) and water are copolymerized by treatment with certain acid catalysts, optionally in the presence of a solvent, to produce higher molecular weight polyol products. The molecular weight (Mw or Mn) of the polyol products can be changed by varying the ratio of water to the multifunctional epoxide compound.

An embodiment of the invention provides a method which comprises copolymerizing a multifunctional epoxide resin, THF and water in the presence of an effective amount of acid catalyst and optionally in the presence of a solvent that substantially dissolves the epoxide resin, THF and water, the amount of water being sufficient to avoid gelation. The copolymerization although conducted with water is not conducted in the form of an aqueous dispersion, or emulsion, polymerization leading to an aqueous polymer dispersion, i.e., it comprises a non-dispersion, non-emulsion, copolymerization.

As yet another embodiment, the higher molecular weight polymeric polyols can be formulated with suitable OH-reactive crosslinking agents, including amino resins such as melamine formaldehyde resins or polyisocyanates, to yield crosslinked films exhibiting excellent properties such as high hardness and solvent resistance at relatively low bake temperatures.

DETAILED DESCRIPTION OF THE INVENTION

The method for making the polymeric polyols comprises polymerizing a multifunctional epoxide resin, THF and sufficient water to prevent gelation of the polymerizing epoxide resin, in the presence of an acid substance and optionally, but preferably, in the presence of a solvent that provides a polymerization medium that dissolves the reactants, i.e., affords solution polymerization. Excess THF, beyond that amount that is copolymerized, can suitably be used as the solvent.

The multifunctional epoxide compounds, or resins, useful in this invention comprise those compounds containing an average of more than one 1,2-oxirane groups per molecule, preferably two such oxirane groups, and which do not contain basic functional groups that destroy the catalytic activity of the acid catalysts, thus preventing the desired copolymerization. Such epoxides are described in U.S. Pat. No. 6,331,583 and U.S. application Ser. No. 10/062,924, filed 31 Jan. 2002, both of which are incorporated by reference in their entirety.

The preferred polyepoxy compounds are the diglycidyl ethers of bisphenol-A, the advanced diglycidyl ethers of bisphenol-A, the diglycidyl ethers of bisphenol-F, the diglycidyl ether of resorcinol and the epoxy novolac resins. The most preferred polyepoxy compounds are the diglycidyl ethers of bisphenol-A.

As the average functionality of the multifunctional epoxy resin is increased, it will be recognized by those skilled in the art that a larger ratio of water per equivalent of epoxide resin will be required to prevent gelation, as predicted by well-known theories of gelation.

The minimum amount of water for the copolymerization will be that amount sufficient to avoid gelation of the polymer product and varies depending on the molecular weight and functionality of the epoxy resin employed, as well as the specific reaction conditions. Using DGEBA, at reaction temperatures ranging from room temperature to the reflux temperature of THF (64° C.), the minimum water required is about 7.5% of the weight of epoxy resin in the reaction mixture. In any event, it is a relatively easy task for one skilled in the art to determine this minimum level of water by preparing batches with successively smaller portions of water until a gelled reaction product is obtained. Higher levels of water can be employed, which reduces the molecular weight of the final product. To obtain polymeric materials with useful molecular weights for the subsequent preparation of coatings, the maximum level of water that should be employed is about 25% of the weight of epoxy resin.

Ordinary tap water can be used to supply the water to prepare the polyols of the current invention. However, in many cases tap water contains high levels of ionic species that may be undesirable in certain applications, and tap water also tends to be somewhat variable in its purity. Therefore, it will often be advantageous to employ deionized or distilled water or another purified form of water. The minimum amount of water for the polymerization will be that amount sufficient to avoid gelation of the polymeric polyol product, desirably about 5–20 g water/100 g epoxide resin. The upper limit for the amount of water is determined by the molecular weight of the polymeric polyol desired. With any given multifunctional epoxide compound, the more water used as a reactant the lower the molecular weight of the polymeric polyol product.

THF is normally employed in significant excess of the amount that becomes incorporated in the copolymer, so that THF serves as a solvent during the reaction and for the final product. Amounts of THF can vary from 3% to 300% of the weight of epoxy resin, preferably from 20 to 150%. It is obvious to one skilled in the art that increasing levels of THF will decrease the viscosity and solids content of the final product.

In order to copolymerize the multifunctional epoxide compound, THF and water, an acid catalyst with the ability to yield the desired technical effect is required. Not all acid substances are suitable. Certain Brønsted acids and certain Lewis acids have been found to be effective catalysts for the copolymerization. Such suitable acid catalysts for this copolymerization are described in U.S. Pat. No. 6,331,583 and U.S. application Ser. No. 10/062,924, filed 31 Jan. 2002, as are recommended catalyst concentrations, and means to neutralize the acid catalysts or remove them from the reaction mixture upon the desired completion of the copolymerization. Removal of the acid catalysts is a preferred method.

The acid material should be sufficiently soluble in the polymerization reaction medium to yield the desired technical effect, desirably at least 0.01 g/100 ml reaction medium solution.

The amount of acid material used is that amount sufficient to catalyze the polymerization reaction of the epoxy resin, THF and water within the temperature and time limits desired. Such catalytic amount will depend on the acid material, the solvent and the epoxy resin used, but in general may range from 0.001 to 1 eq acid catalyst per liter, preferably 0.01 to 0.5 eq/L.

Suitable acids include certain Brønsted acids, especially Brønsted superacids, and certain Lewis acids. Brønsted acid materials should have a pKa $\leq 1$, preferably $\leq 0$.

Particularly useful Lewis acids include $BF_3$ and its complexes with alcohols, ethers, water and the like such as boron trifluoride etherate.

Particularly useful superacids for this process in general, and for the copolymerization of water, THF and diglycidyl ethers of dihydric phenols in particular, include perchloric, fluorosulfuric, trifluoromethanesulfonic, perfluoroalkylsulfonic, tetrafluoroboric, and hexafluorophosphoric acids and boron trifluoride.

The molecular weight of the polyol product of the copolymerization is dependent on the amount of water employed relative to the amount of multifunctional epoxide. Useful number average molecular weights (Mn), as measured by GPC vs. polystyrene standards, are at least about twice the molecular weight of the multifunctional epoxy resin from which it is prepared, (for diglycidyl ether of bisphenol-A at least about 750), preferably at least about four times the molecular weight, and may range as high as about eight times or more, with the maximum Mn being that which can be achieved without gelling the reaction medium. Below a certain critical, minimum amount of water the product of the reaction is a gel, and hence the molecular weight is undefined. Using commercial diglycidyl ether of bisphenol-A with an equivalent weight of 185–192, it was found that this minimum amount of water was dependent on the specific catalyst employed, the amount of that catalyst, the nature of the solvent for the reaction, and the temperature, but is in the range of about 2.5 to 8 g of water per 100 g of diglycidyl ether of bisphenol-A at temperatures from about 25° C. to 90° C. In general, for a difunctional epoxide resin, about 0.7 to 0.8 moles of water, or about 12.6 to 14.4 g of water, is required per equivalent of epoxide. Epoxide resins with functionalities greater than 2 will require even greater amounts of water to prevent gelation. In any event, it is relatively straightforward for one skilled in the art to determine the critical amount of water by conducting small scale reactions using progressively smaller amounts of water relative to epoxy resin until a gelled product is obtained.

Suitable solvents which may employed in this copolymerization are those solvents that substantially dissolve the multifunctional epoxide compound, the THF and the water so that an essentially homogenous reaction mixture is obtained. Obviously, THF is the solvent of choice when used in excess.

Other advantages to the use of a solvent include the ability to reduce the viscosity of the reaction medium, which can become very high if the amount of water employed is just sufficient so as to avoid gelation, and the ability to control the temperature of the reaction more reliably. The solvent should also not be so basic that it interferes with the action of the acid catalyst. Importantly, solvents should either not participate to a significant degree in any side reactions under the reaction conditions, or if they do participate in side reactions, should not impart deleterious properties to the function of the product in its intended use. Preferred solvents include ethers and specific examples are the water miscible ethers, such as 1,4-dioxane, 1,2-dimethoxyethane, diglyme, triglyme, and the much preferred THF.

The reaction can be conducted at temperatures from 0° C. or below up to about 250° C., though the reaction is preferably conducted from about 20° C. to about 150° C., and most preferably from about 40° C. to 64° C., the boiling point of THF at atmospheric pressure. To employ temperatures greater than 64° C. requires that the process be conducted at pressures greater than atmospheric pressure. The pressure for the reaction is normally atmospheric pressure, though the reaction can be run under alternative pressures if desired.

The reaction can be accomplished by mixing the epoxy resin, THF, and 0 to 100% of the wafer, and then adding the acid catalyst along with the remaining required water, if any. Since the copolymerization is highly exothermic, this procedure can generate a significant amount of heat. In large scale operations it can be difficult to remove the heat generated from this process so as to control the temperature of the reaction. An alternative procedure that avoids this problem is to combine some or all of the solvent (THF), 0 to 100% of the water, and optionally a portion of the epoxy resin, and then add the acid catalyst and any remaining water. The remaining epoxy resin, diluted in any remaining THF, is then gradually added to the reaction mixture over a period of time ranging from about 15 minutes to 24 hours, preferably from a half hour to 8 hours. In this manner the heat evolved during the reaction can be more easily be removed, and the reaction temperature better controlled. Many other minor variations to these processes will also be apparent to one skilled in the art.

It is usually desirable to either neutralize the acid catalyst for the copolymerization and/or to remove it from the reaction medium. Neutralization can be accomplished by addition of a base, such as sodium, potassium, or lithium hydroxide or sodium or potassium carbonate. Other suitable bases are well known to one skilled in the art. Removal of the catalyst can be accomplished by neutralizing with a base that forms a salt that is insoluble in the reaction medium followed by filtration, or by treatment of the reaction mixture with an ion exchange resin that will remove the acid catalyst, such as a strong or weak base ion exchange resin.

The polymers prepared by the process of this invention can be crosslinked using crosslinking agents that react with hydroxyl groups. Many such crosslinking agents are known and of industrial importance. Such crosslinking agents are taught in U.S. Pat. No. 6,331,583 B1 and U.S. application Ser. No. 10/062,924 and include the so-called amino resins which include melamine-formaldehyde resins, urea-formaldehyde resins, benzoguanamine-formaldehyde resins, glycouril-formaldehyde resins, as well as the etherified derivatives of these resins. Another useful class of crosslinkers that react with OH groups are the multifunctional isocyanates. Resoles are another useful class of OH-reactive crosslinking agents.

When employing amino resin cross linkers it is frequently found necessary to include an acid catalyst in the coating formulation. Depending on the type of amino resin employed, this may be a strong acid catalyst such as a sulfonic acid, or a weaker acid such as a carboxylic acid.

Amino resins and polyols are not usually formulated on the basis of stoichiometry, but rather on a weight basis. The ratio of the weight of polymer solids of the current invention to amino resin crosslinker solids that yields useful properties can vary from about 99:1 to 50:50, and preferably from about 98:2 to 70:30.

The time and temperature of cure for an amino resin can vary considerably depending upon the nature of the formulation, the catalyst level, the blocking agent for the catalyst if one is present, and the exact properties desired. Catalyst levels can vary from about 0.05% based on total resin solids to about 10%. Cure temperature can vary from ambient temperature (about 20° C.) to about 300° C., and cure times can vary from several hours to just a few seconds.

Isocyanates useful in curing the polymers of the current invention include both aromatic and aliphatic isocyanates. Useful aromatic isocyanates include any of the commercially available aromatic isocyanates such as toluene diisocyanate (TDI), diphenylmethane-4,4'-diisocyanate (MDI), and aromatic isocyanates derived from oligomers of the reaction of formaldehyde and aniline. Aliphatic isocyanates include any of the commercially available aliphatic isocyanates such as isophorone diisocyanate (IPDI), hexamethylene diisocyanate (HMDI), trimethylhexamethylene diisocyanate, bis-(4-isocyanatocyclohexyl)-methyl diisocyanate (H12MDI), tetramethylxylylene diisocyanate (TMXDI), and polymeric isocyanates prepared by the polymerization of m-isopropenyl-α,α-dimethylbenzyl isocyanate (m-TMI). In addition, derivatives of the aliphatic and aromatic diisocyanates such as their isocyanurate timers, biurets, and adducts with polyols such as trimethylolpropane are also useful crosslinkers for the current invention.

Coatings prepared from the resins of the current invention and crosslinkers can be formulated with a wide variety of ingredients well known to those skilled in the art of coating formulation, including solvents, fillers, pigments, pigment dispersing agents, rheology modifiers, thixotropes, flow and leveling aids, defoamers, and the like.

Coatings of this invention can be applied by any number of techniques including spray, brush, roller, doctor blade, and others known in the art. They may also be applied using specialized industrial equipment such as that employed in coil coatings. Numerous substrates are suitable for application of coatings of this invention with proper surface preparation, as is well understood in the art. Such substrates include but are not limited to many types of metal, particularly steel and aluminum, as well as wood and various plastics.

EXAMPLE 1

This example shows the preparation of copolymer (polymeric polyol) using 10 g water per 100 g epoxy resin. In a 250 mL 3-neck round bottom flask equipped with a mechanical stirrer, thermocouple and reflux condenser were placed 50 g of Epon® 828 liquid epoxy resin based on the diglycidyl ether of bisphenol-A (Resolution Chemical Company, epoxy equivalent weight 185–192) and 50 g of THF. A mixture of 1.67 g of 60% perchloric acid in water and 4.33 g of water was then added at room temperature through an addition funnel over the course of about 5 min. The resulting exotherm raised the temperature of the mixture to 52° C. When the exotherm subsided, the reaction mixture was heated by means of a heating mantle to the reflux temperature of THF (65° C.), and held at that temperature for 4 hours, at which point measurement of the extent of reaction by the procedure of Example 2 indicated that epoxide functionality could no longer be detected. The reaction mixture was neutralized by the addition of 12.5 mL of Amberlite® IRA-67 weak base ion exchange resin (Rohm and Haas Corporation), additional THF was added, and the mixture was then filtered to remove the ion exchange resin. The final product was found to be 48.08% solids, and by GPC had Mw=4925, Mn=1935, and Mw/Mn=2.54 as measured in THF vs. polystyrene standards.

EXAMPLE 2

This example explains the procedure for measuring the extent of reaction by IR spectroscopy. A few drops of solution are placed on an out-of-compartment attenuated total reflectance 45° Zn—Se flat cell, available from Spectra-tech, Inc., Shelton, Conn. The solution is smeared across the cell surface using a soft cotton pad. Solvent is allowed to evaporate from the resulting thin film for about 1 min. The IR spectrum (32 scans) is then obtained in absorption mode, and then processed to obtain the 2nd derivative of the spectrum. The heights of the gem-dimethyl absorbances at 1383 and 1362 $cm^{-1}$ are then measured, and divided into the height of the epoxy ring absorbance at 916 $cm^{-1}$. This yields a normalized absorbance for the epoxide, since the gem-dimethyl group is inert toward the reaction conditions. To estimate the extent of reaction as a function of time, the normalized epoxy absorbance at time t is divided by the normalized absorbance at t=0. This procedure will not be accurate if the solvent has a strong absorbance near 916 $cm^{-1}$ and the solvent is slow to leave the film, as can happen when high molecular weight products are prepared.

EXAMPLES 3–10

These examples show the preparation of polymeric polyols using varying amounts of water. Following the general procedure of Example 1, the polyols described in Table 1 were prepared. The reactions were held at temperature until the IR spectrum indicated that the reaction was essentially complete (>98% conversion of epoxide). The results show that decreasing the ratio of water to epoxy resin resulted in an increase in the molecular weight and polydispersity of the final product. In fact, Example 6 shows that insufficient water resulted in a gelled product.

TABLE 1

| Ex | Epon 828 | THF | Catalyst | Catalyst Amount | DI Water | % Water on Epoxy Resin | % Solids | Mw | Mn |
|---|---|---|---|---|---|---|---|---|---|
| 3 | 50 | 50 | 60% HClO4 | 1.67 | 3.08 | 7.5 | 48.66 | 23100 | 3650 |
| 4 | 100 | 100 | 60% HClO4 | 3.33 | 8.67 | 10 | 69.61 | 4643 | 2123 |
| 5 | 150 | 150 | 60% HClO4 | 5.00 | 9.25 | 7.5 | 64.05 | 14637 | 3853 |
| 6 | 50 | 50 | 60% HClO4 | 1.67 | 2.83 | 7 | NA | Gel | Gel |

TABLE 1-continued

| Ex | Epon 828 | THF | Catalyst | Catalyst Amount | DI Water | % Water on Epoxy Resin | % Solids | Mw | Mn |
|---|---|---|---|---|---|---|---|---|---|
| 7 | 50 | 50 | CF3SO3H | 1.49 | 4 | 8 | NA | 15300 | 3160 |
| 8 | 50 | 50 | 50% HBF4 | 1.75 | 3.13 | 8 | NA | 18500 | 2940 |
| 9 | 100 | 100 | BF3 Diethyl-etherate | 2.24 (2 mL) | 7.5 | 7.5 | 71.4 | 15705 | 3683 |
| 10 | 50 | 50 | HClO4 | 1.67 | 6.83 | 15 | | 2090 | 1255 |

EXAMPLE 11

This example shows the preparation of copolymer using 8.83 g water per 100 g epoxy resin and gradual addition process. In a 500 mL 4-neck round bottom flask equipped with a mechanical stirrer, thermocouple and reflux condenser were placed 30 g of Epon® 828 resin, 76.67 g of THF, and 7.50 g of water. Then 3.33 g of 60% perchloric acid was added to the mixture dropwise using an addition funnel. Over the course of about 30 min, the temperature rose to 29° C. The temperature was raised to reflux (65° C.) by means of a heating mantle, and a mixture of 70 g of Epon® 828 resin and 23.33 g THF was added to the reaction mixture over the course of about 3 hours, then held at 65° C. for an additional 3 hour. The temperature was reduced to 35° C., and 25 mL of Amberlite® IRA-67 weak base ion exchange resin was added to neutralize and remove the acid catalyst. The final product by GPC had Mw=7,495, Mn=2345, and Mw/Mn=3.2 as measured in THF vs. polystyrene standards.

EXAMPLES 12–17

These examples show melamine cured coatings made from the polyols of Examples 1 and 3–5, and comparison to control formulations. Table 2 shows the formulations in parts by weight. The formulations contained ratios of polyol resin to hexamethoxymethyl melamine-formaldehyde resin (HMMM, Resimene® 747 resin, Solutia Inc.) ranging from 95:5 to 80:20 on a solids basis, and contained 0.36% Nacure® 2500 blocked p-TSA catalyst on solids. The formulations were let down with a 1:1 butanol/methyl amyl ketone (MAK) solvent mixture, and also contained a small amount of flow and leveling aid (Modaflow® additive from Cytec Industries, or Byk-310 additive from Byk-Chemie). The formulations were applied to Bonderite® 1000 panels (Fe-phosphate treated steel) with a #20 wire wound bar. Solvents were then allowed to flash off from the panels for 30 minutes in a hood. The panels were then baked for 30 minutes at the specified temperatures given in Table 3.

TABLE 2

Coating Formulations

| | Example | | | | | | | | | | |
|---|---|---|---|---|---|---|---|---|---|---|---|
| | 12 | | 13 | | 14 | | 15 | | 16 | | 17 | |
| | Polyol Example | | | | | | | | | | |
| | Ex. 1 | | Ex. 4 | | Ex. 1 | | Ex. 3 | | Ex. 5 | | Ex. 3 | |
| | Weight | Solids Weight | Weight | Solids Weight | Weight | Solids Weight | Weight | Solids Weight | Weight | Solids Weight | Weight | Solids Weight |
| Polyol | 16.64 | 8.00 | 12.93 | 9.00 | 19.76 | 9.50 | 16.44 | 8.00 | 14.06 | 9.00 | 19.52 | 9.50 |
| Solvent | 14.69 | 0.00 | 19.37 | 0.00 | 13.05 | 0.00 | 14.89 | 0.00 | 18.24 | 0.00 | 13.29 | 0.00 |
| HMMM | 2.04 | 2.00 | 1.02 | 1.00 | 0.51 | 0.50 | 2.04 | 2.00 | 1.02 | 1.00 | 0.51 | 0.50 |
| Byk-310 | | | 0.03 | 0.01 | 0.03 | 0.01 | | | 0.03 | 0.01 | 0.03 | 0.01 |
| Modaflow ® | 0.02 | 0.02 | | | | | 0.02 | 0.02 | | | | |
| Nacure ® 2500 | .012 | .03 | 0.12 | 0.03 | 0.12 | 0.03 | 0.12 | 0.03 | 0.12 | 0.03 | 0.12 | 0.03 |
| Total | 33.51 | 10.05 | 33.47 | 10.04 | 33.47 | 10.04 | 33.51 | 10.05 | 33.47 | 10.04 | 33.47 | 10.04 |

TABLE 3

Coatings Performance Properties

| | Example | | | | | |
|---|---|---|---|---|---|---|
| | 12 | 13 | 14 | 15 | 16 | 17 |
| Dry Film Thick. (mil) | | | | | | |
| Cure at 110° C. | 0.38 | 0.27 | 0.48 | 0.38 | 0.29 | 0.59 |
| Cure at 130° C. | 0.39 | 0.28 | 0.40 | 0.29 | 0.30 | 0.49 |
| MEK Dbl Rubs | | | | | | |
| Cure at 110° C. | Fail @ 130 | Fail @ 10 | Fail @ 3 | >250 | Fail @ 30 | Fail @ 5 |
| Cure at 130° C. | Fail @ 140 | Fail @ 20 | Fail @ 3 | >250 | Fail @ 35 | Fail @ 5 |
| Direct Impact | | | | | | |
| Cure at 110° C. | 104 | >160 | >160 | 120 | >160 | >160 |
| Cure at 130° C. | 120 | >160 | >160 | 48 | >160 | >160 |
| Cross-hatch | | | | | | |

TABLE 3-continued

| | Coatings Performance Properties | | | | | |
|---|---|---|---|---|---|---|
| | Example | | | | | |
| | 12 | 13 | 14 | 15 | 16 | 17 |
| Adhesion to Cold Rolled Steel (Dry/Wet) | | | | | | |
| Cure at 110° C. | 5B/0B | 5B/1B | 5B/5B | 5B/0B | 5B/3B | 5B/1B |
| Cure at 130° C. | 5B/0B | 5B/3B | 5B/5B | 5B/0B | 5B/3B | 5B/1B |

The data in Table 3 indicates that coatings with useful properties can be made from polyols of the present invention. Increasing the ratio of melamine crosslinker to polyol yielded coatings with greater solvent resistance, while decreasing that ratio lead to coatings with improved impact resistance.

STATEMENT OF INDUSTRIAL APPLICATION

The invention provides a method for the preparation of polymeric polyols from epoxy resins, THF and water suitable for use in coating compositions.

I claim:

1. A method for preparing a polymeric polyol which comprises copolymerizing a multifunctional epoxide resin, tetrahydrofuran (THF) and water in the presence of an amount of acid effective for polymerizing the epoxide resin, THF and the water, the amount of water being sufficient to avoid gelation, the copolymerization being a non-dispersion process.

2. The method of claim 1 in which the copolymerization is performed in the presence of a water miscible ether solvent.

3. The method of claim 2 in which the solvent comprises excess THF.

4. The method of claim 1 in which the epoxide is a diglycidyl ether of bisphenol-A, an advanced diglycidyl ether of bisphenol-A, a diglycidyl ether of bisphenol-F or an epoxy novolac resin.

5. The method of claim 1 in which the acid is a Brønsted acid having a $pKa \leq 0$.

6. The method of claim 1 in which the acid is a Brønsted superacid.

7. The method of claim 1 in which the acid is perchloric acid, trifluoromethane-sulfonic acid, perfluoroalkylsulfonic acid, tetrafluoroboric acid, hexafluorophosphoric acid or boron trifluoride.

8. The method of claim 1 in which the minimum amount of water is about 5 to 20 g water per 100 g of epoxide resin.

9. The method of claim 1 in which the amount of THF is about 3 to 300 wt % of the epoxide resin.

10. The method of claim 1 in which the amount of THF is about 20 to 150 wt % of the epoxide resin.

11. A method for preparing a polymeric polyol which comprises copolymerizing a multifunctional epoxide resin, which is a diglycidyl ether of bisphenol-A, an advanced diglycidyl ether of bisphenol-A, a diglycidyl ether of bisphenol-F or an epoxy novolac resin, tetrahydrofuran (THF) and water in the presence of an amount of a superacid effective for such copolymerization, the amount of water being sufficient to avoid gelation, the amount of THF being 3 to 300 wt % of the epoxide resin and the copolymerization being a non-dispersion process.

12. The method of claim 11 in which the THF is 20 to 150 wt % of the epoxide resin.

13. The method of claim 12 in which the minimum amount of water is about 5 to 20 g per 100 g of epoxide resin.

14. The method of claim 13 in which the epoxide resin is the diglycidyl ether of bisphenol-A.

15. The method of claim 14 in which the acid is perchloric acid, trifluoromethane-sulfonic acid, perfluoroalkylsulfonic acid, tetrafluoroboric acid, hexafluorophosphoric acid or boron trifluoride.

16. The method of claim 11 in which the acid is perchloric acid, trifluoromethane-sulfonic acid, perfluoroalkylsulfonic acid, tetrafluoroboric acid, hexafluorophosphoric acid or boron trifluoride.

17. The method of claim 11 in which the acid is perchloric acid.

18. The method of claim 11 in which the amount of acid is 0.001 to 1 eq/L.

19. A method for preparing a polymeric polyol which comprises copolymerizing a diglycidyl ether of bisphenol-A, tetrahydrofuran (THF) and water in the presence of a superacid at 0.001 to 1 eq/L, the minimum amount of water being about 7.5 wt % of the diglycidyl ether of bisphenol-A, the amount of THF being 3 to 300 wt % of the diglycidyl ether of bisphenol-A and the copolymerization being a non-dispersion process.

20. The method of claim 19 in which the acid is perchloric acid, trifluoromethane-sulfonic acid, perfluoroalkylsulfonic acid, tetrafluoroboric acid, hexafluorophosphoric acid or boron trifluoride.

21. The method of claim 20 in which the amount of water is 2.5 to 8 g per 100 g diglycidyl ether of bisphenol-A.

22. A coating composition comprising a polymeric polyol made according to the method of claim 1 and a hydroxyl group-reactive crosslinking agent.

23. A coating composition comprising a polymeric polyol made according to the method of claim 11 and a hydroxyl group-reactive crosslinking agent.

24. The coating composition of claim 22 in which the crosslinking agent is an amino resin or a multifunctional isocyanate.

* * * * *